United States Patent Office 2,783,853
Patented Mar. 5, 1957

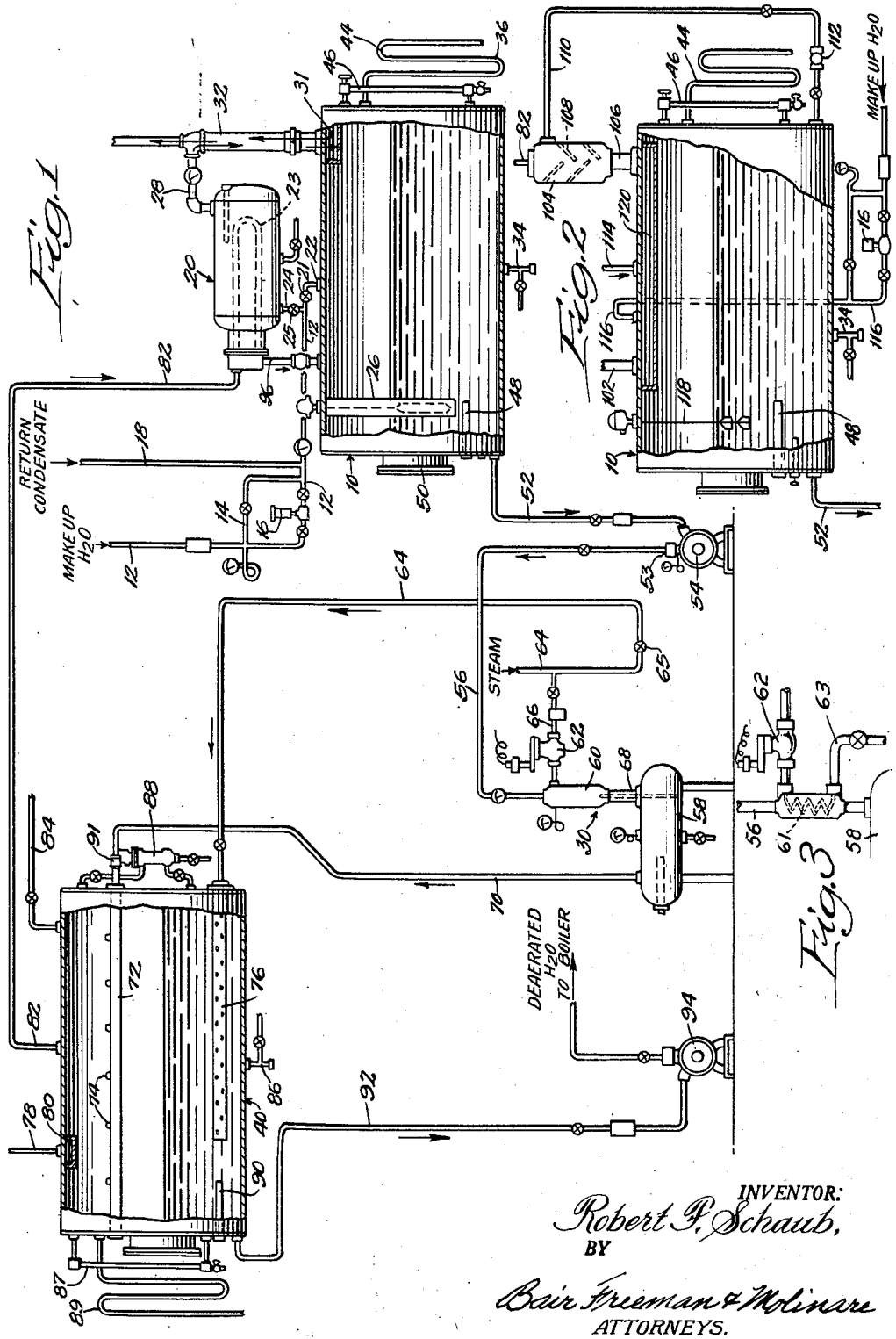

2,783,853
APPARATUS FOR DEAERATING WATER

Robert F. Schaub, Chicago, Ill., assignor to Fred H. Schaub Engineering Co., Inc., Chicago, Ill., a corporation of Illinois Application March 16, 1954, Serial No. 416,531

7 Claims. (Cl. 183—2.5)

This invention relates to an apparatus for removing gases from liquids and more particularly for removing dissolved air from water intended for use in boilers. It is well known that oxygen present in water as air or otherwise is one of the primary causes of corrosion at the elevated temperatures which prevail in boilers. The maximum allowable oxygen content for minimum corrosion in many industrial plants is about 0.01 cubic centimeters per liter of water. Most raw water contains about 6 cubic centimeters of oxygen per liter. Consequently, substantially all of the oxygen dissolved or dispersed in the water in any form must be removed to render it suitable for boiler feed.

Conventionally, air is removed from water by spraying the water at ambient temperature into a tank from which the liberated air is vented. The deaerated water falls to the bottom of the tank and is maintained at a temperature close to the boiling point by introduction of steam directly into the tank. Difficulty has been experienced in maintaining required boiling-point temperatures within the tank without incurring large steam losses through the vent along with the liberated gases. Restrictions commonly placed in the vent to reduce the quantity of escaping steam cause a pressure rise within the tank, which in turn complicates the task of controlling the critical temperature-pressure relationship, especially when the flow rate of the input water and the gas liberation rate varies.

It is an object of this invention to provide an improved apparatus for deaerating water comprising external water heating means outside a vented deaerating chamber, a surge tank for storing water to be treated, and a vent condenser connecting to the surge tank for condensing effluent vapors flowing from the deaerating chamber.

It is another object of the invention to provide an efficient apparatus for continuously deaerating water in which steam vapors escaping through the vent of the deaerating chamber are condensed and discharged into the surge tank, said condensation being effected in a condenser cooled with water supplied to the surge tank for deaerating treatment.

Another object is to provide an apparatus of the nature described in which the deaerating chamber is maintained at atmospheric pressure by venting to a surge tank which in turn is vented to the atmosphere, to facilitate the flow of liberated gases from the deaerating chamber.

A further object is to provide a more efficient apparatus for continuously deaerating water in which the water to be treated is fed from the surge tank to a pressurized heater wherein the temperature of the water is raised above atmospheric boiling point and delivered under pressure to spray nozzle disposed within the deaerating chamber maintained at atmospheric pressure. These and other objects will become apparent from the following detailed description as illustrated in the accompanying drawings.

In the drawings:

Figure 1 is a diagrammatic view, partly in cross section, of the apparatus of the invention.

Figure 2 is a similar view of the surge tank 10 of Figure 1, which has been modified to accommodate an alternative condenser construction.

Figure 3 is an elevational view of an alternative construction for the steam and water mixer 60, with connections.

Basically, the apparatus shown in Figure 1 consists of a surge tank 10 which serves as a reservoir for the feed water to be treated, a heating assembly 30 to raise the temperature of the feed water, a deaerating chamber 40 into which the super-heated feed water is sprayed under pressure and from which the deaerated water is supplied to the boiler, and a condenser 20 for condensing effluent vapors from the chamber 40.

The surge tank 10 is a vented vessel, and may contain a manhole opening 50 at one end for cleaning and inspection purposes. Make-up water to be deaerated is supplied to the tank 10 through conduit 12 which connects to the surge tank as indicated at 22. Any low pressure returned condensate having terminal temperatures below 212°, will contain some air, and is also fed to tank 10 through line 18 which joins line 12 upstream of connection 22. Valve 21 in line 12 just above the connection 22 is normally closed so that the flow from line 12 is through valved branch line 24 to condenser 20 and back into the tank 10, as described hereinbelow. An automatic liquid level control device 26, of conventional construction, serves to open a suitable valve 16 in the line 12 to supply make-up water as required to maintain a predetermined liquid level in tank 10. A valved by-pass line 14, connecting to line 12 on either side of valve 16, may be employed to supply water to the tank 10 independently of the automatically-controlled valve 16. Branch line 24 containing a valve 25 connects to the bottom of the shell of condenser 20, mounted above tank 10, for supplying low temperature condensate, fresh water, or mixtures thereof from the line 12 as the cooling liquid therefor. The shell of the condenser is relatively large so that a substantial quantity of cooling water may be stored therein. The valve 25 is normally open to permit all of the liquid in line 12 to pass through the condenser 20. Discharge pipe 28 leading from the opposite (top) side of the condenser connects to a large diameter vent pipe 32. The lower end of the vent pipe 32 connects to the top of the tank 10 near the right-hand end thereof. The upper end of pipe 32 is open to the atmosphere. A baffle 31, spaced below the upper surface of the tank wall directly beneath pipe 32, serves to retard the flow of fluids from the tank and to prevent splashing. When water is flowing through the line 12 it circulates through the condenser and is discharged into tank 10 through pipe 32. When there is no flow, water stored in the enlarged shell of the condenser 20 still functions as a coolant.

A suitable drain 34 is provided in the bottom of the tank 10. A U-shaped pipe 44 joining the right-hand end of tank 10 near the top thereof functions as an overflow in the event the tank should become filled above this level due to the accumulation of large volumes of condensate, for example. For convenience, a sight glass 46 may be fixed to the end of the tank to indicate the liquid level within. An electrolytic corrosion inhibitor 48 also may be provided within the tank.

A pump 54 driven by a suitable motor (not shown)

is used to convey feed water from surge tank 10 through conduit 52 to the heating and deaerating portion of the apparatus. The discharge side of the pump 54 joins with the conduit 56 which leads to heating assembly 30. The pump is adapted to function when the liquid level control device 88 on the deaerator tank 40 calls for water.

The heating assembly comprises a horizontally disposed cylindrical blending chamber 58 having hemispherical ends, a steam and water mixer 60 attached to the top thereof and a temperature regulating device 62 of conventional construction. If desired, a conventional shell and tube type of indirect heater may be substituted for the steam and water mixer 60. Such a construction is shown in Figure 3 and is identified by the numeral 61. Steam is fed into the coil from the line 66 and is discharged through line 63. Feed water line 56 and steam line 66, connected to a source of steam through supply line 64, both connect suitably to the mixer 60, which in turn joins the chamber 58 through a short length of pipe 68. Temperature regulating valve 62 is adapted to admit varying quantities of pressurized steam to the mixer 60 in response to temperature variations within chamber 58, thus controlling the temperature of the water within the chamber. The temperature of the water emanating from chamber 58 through conduit 70 may range between temperature limits of 215° to 235° F., with a normal control point of 225° F., while being held at a pressure of from 5 to 10 pounds per square inch. A check valve 53 in line 56 just upstream of pump 54 prevents pressurizing the system beyond this point. Conduit 70 leads from chamber 58 to a manifold 72 axially disposed within the horizontal deaerating chamber 40 about one-fourth the way down from the top. A plurality of spring loaded nozzles 74 spaced longitudinally along the manifold 72 are adapted to spray a fine stream of heated and pressurized feed water into the cylindrical chamber 40, which is maintained at atmospheric pressure. Air, oxygen, carbon dioxide and any other noncondensable gases dissolved in the superheated water are explosively liberated as the water flashes down to the atmospheric boiling point of 212° F. in passing through the pressurized spray nozzles. The deaerated water falls to the bottom of the chamber.

Costant level device 88 controls the level of liquid within chamber 40 by closing the circuit to the motor driving pump 54 when deaerated water is fed from the chamber to the boiler. An auxiliary heater 76 comprising a tube having a multiplicity of apertures through the wall thereof connects to steam line 64 and is adapted to maintain the temperature of the storage water within the deaerating chamber at the full 212° F. boiling point of the water. The quantity of steam passing to heater 76 may be regulated by the steam flow control valve 65 in line 64. The auxiliary heater 76 is required only to offset radiation losses, occuring after the deaerated water falls to the storage portion of chamber 40. By maintaining the temperature within the chamber at the boiling point the possibility of reabsorption of non-condensable gases is eliminated.

An electrolytic corrosion inhibitor 90 is disposed within the left-hand end of the deaerating chamber 40 to reduce corrosion within the chamber and the connecting piping to a minimum. A sight glass 87 and a U-shaped overflow tube 89 are provided in the same end of the chamber. Valved conduit 86 in the bottom of chamber 40 serves as a drain. To supply deaerated water to the boiler, exit conduit 92 connects to the chamber 40 close to the bottom thereof, and the opposite end of the conduit connects to the boiler feed pump (or pumps) 94. Pump 94 serves to convey the deaerated water from the tank 40 to the boiler or boilers as required.

Several conduits connect to the top of the chamber 40, conduit 78 for the purpose of delivering high pressure, high temperature returns or drips (which contain no entrapped gases) to the deaerating chamber, vent line 82 for permitting the escape of liberated gases (along with water vapor) from the chamber, and conduit 84 for supplying city water to the chamber 40 in cases of emergency. A splash baffle 80 is provided within the tank beneath conduit 78. Vent line 82 connects to the coils 23 inside the condenser 20 mounted on the top of the surge tank. An exit pipe 96 joins the other end of coil 23 to the interior of the surge tank 10. Steam resulting from the flashing down of the sprayed superheated water and liberated gases are vented from chamber 40 through line 82, condenser 20 and pipe 96 into the tank 10. The gases escape from tank 10 through vent 32 to the atmosphere, while the condensed steam falls to the bottom of the tank, and is recirculated through the system.

Briefly, the operation of the apparatus shown in Figure 1 is as follows: As the boiler calls for water, the pump 94 draws deaerated water from the chamber 40. When the liquid level in the chamber falls, the level control device 88 starts the pump 54 which moves water from the surge tank 10 to the heating device 30, through conduit 70, and into the chamber 40. The flow is continuous as long as the deaerated water in chamber 40 remains below a predetermined level. As soon as the supply of water stored in the surge tank 10 is reduced below a predetermined level, the control device 26 opens the valve 16 in line 12 to admit make-up water once again to raise the level in the tank.

As pointed out, steam formed when superheated water is sprayed into the deaerating chamber escapes through vent 82, is condensed in condenser 20 and flows into the surge tank 10. If all of the steam passing through vent line 82 has not been condensed in the condenser 20 the uncondensed portion will rise in the pipe 32 and escape to the atmosphere. By discharging cooling water from the condenser 20 through pipe 32 all uncondensed steam is contacted by the water and thereby further condensed. All of the liberated gases which are discharged into the surge tank escape to the atmosphere through vent pipe 32.

In the alternative construction shown in Figure 2, the surge tank 10 has a vent 102 mounted in the top thereof for permitting the escape of liberated gases which are delivered to the surge tank through the line 82 and the condenser 104. Condenser 104 differs from condenser 20 in that the water vapors and gases discharged from the vent line 82 are brought into direct intimate contact with cooling water continuously circulated through the condenser from the surge tank. The vent line 82 connects to the top of the condenser and the short nipple 106 connects the condenser to the surge tank 10. Internal baffles 108 are provided to bring about intimate mixture of the entering gases and steam or water vapor with the cooling water which is circulated through the condenser. Cooling water enters the condenser through line 110 which connects to the side wall thereof near the top. The opposite end of the line 110 connects to the lower portion of the surge tank 10. A circulating pump 112 is provided in the line 110 for purposes of continuously conveying the water from the surge tank up to the condenser 104. Both condensed water and cooling water flow into the tank 10 from condenser 104 through pipe 106.

The condensate line 114 serves to conduct returned low temperature condensate into the surge tank. Make-up water is added as required to maintain the liquid level through line 116. The make-up water regulating means is identical to that shown in Figure 1. A baffle 120 is provided beneath the openings in the top of the surge tank to which the various inlet and outlet pipes are connected.

The apparatus described in Figure 1 operates in the same manner as described previously when the surge tank assembly shown in Figure 2 is inserted therein. The only significant difference lies in the construction of the condenser 104. This arrangement is somewhat more economical from the standpoint of purchase cost.

In operating the apparatus of the invention I have been able consistently to reduce the oxygen content of feed waters to well below the figure required (0.01 cubic centimeter per liter) for reducing contamination to a minimum. The actual oxygen content of water deaerated on my apparatus measures down to 0.002 cubic centimeter per liter irrespective of load changes. By cycling all condensed vapors, which are contaminated with a certain amount of dissolved oxygen and carbon dioxide, through the surge tank instead of permitting them to flow back into the deaerating chamber, these condensed vapors are again deaerated, thus improving the efficiency of the system.

By heating the feed water to above atmospheric boiling temperature outside the deaerating chamber and operating the deaerating chamber at atmospheric pressure, quick release of liberated gases is assured without sacrificing thermal efficiency and without wasteful excess steam vapor loss common to conventional design deaerators. Additionally, the chamber 40 is fully vented, for complete safety, and no complex internal shell design is required to induce gas flow out of the deaerating chamber.

Although I have shown specific embodiments of my invention, it will be understood that the apparatus is susceptible of changes in the arrangement of the parts, without departing from the spirit of the invention. It is not my purpose to limit the invention other than as necessitated by the scope of the appended claims.

What I claim is:

1. In an apparatus for removing gas in feed water, a surge tank for receiving and storing the feed water to be treated and communicating freely with the atmosphere, heating means for raising the temperature of the feed water above the atmospheric boiling point, a deaerating chamber containing a spray nozzle, an unrestricted vent line connecting said chamber to said surge tank to maintain the interior thereof at atmospheric pressure, means for conveying feed water from said tank through said heating means and for discharging under pressure feed water above its normal boiling point through said nozzle to liberate gases therein, a condenser mounted in said vent line above said surge tank for recovering water from the mixture of steam and non-condensable liberated gases escaping through the vent line from said chamber and for returning the water to said surge tank, and means for conveying gas-free water from said deaerating chamber.

2. The apparatus of claim 1 in which the means for heating the said water comprises a mixing chamber adapted to introduce sufficient steam into the said water to raise the temperature thereof above the normal boiling point of the water.

3. The apparatus of claim 1 in which the means for heating said water comprises a shell containing heated coils over which the water flows to raise the temperature thereof above the normal boiling point of the water.

4. In an apparatus for removing gas in feed water, a surge tank for receiving and storing the feed water to be treated, heating means for raising the temperature of the feed water above the atmospheric boiling point, a deaerating chamber containing spray nozzles, an unrestricted vent line connecting said chamber to said surge tank for maintaining the interior of the chamber at atmospheric pressure, means for conveying feed water from said tank through said heating means and for discharging under pressure feed water above its normal boiling point through said nozzles to liberate gases therein, a condenser in said vent line for condensing steam from the mixture of steam and non-condensable gases passing from said chamber to said tank through said line, means for circulating, as cooling fluid, water from said surge tank through said condenser in intimate contact with the vapor mixture flowing therethrough, a vent in said surge tank communicating freely with the atmosphere to permit the escape of said non-condensable gases to the atmosphere, and means for conveying gas-free water from said deaerating chamber.

5. In an apparatus for removing gas in feed water, a surge tank for receiving and storing the feed water to be treated, heating means for raising the temperature of the feed water above the atmospheric boiling point, a deaerating chamber containing spray nozzles, an unrestricted vent line connecting said chamber to said surge tank for maintaining the interior of the chamber at atmospheric pressure, means for conveying feed water from said tank through said heating means and for discharging under pressure feed water above its normal boiling point through said nozzles to liberate gases therein, a condenser mounted in said vent line above said surge tank, said condenser containing a coil through which a mixture of steam and non-condensable gases escaping from said chamber flow into said surge tank, a vent tube connecting to said surge tank communicating freely with the atmosphere to permit the escape of said non-condensable gases to the atmosphere, means for supplying cooling water to said condenser to condense the steam flowing through said coil, a cooling water discharge conduit connecting said condenser to said vent tube whereby cooling water discharged from said condenser is delivered to said surge tank, and means for conveying water from said deaerating chamber.

6. In an apparatus for removing gas in feed water, a surge tank for receiving and storing the feed water to be treated, heating means for raising the temperature of the feed water above the atmospheric boiling point which comprises a mixing chamber for introducing pressurized steam into the feed water, a deaerating chamber containing spray nozzles, auxiliary heating means within said deaerating chamber for supplying any heat required to keep deaerated water within said chamber at the boiling point, an unrestricted vent line connecting said chamber to said surge tank for maintaining the interior of the chamber at atmospheric pressure, means for conveying feed water from said tank through said heating means and for discharging under pressure feed water above its normal boiling point through said nozzles to liberate gases therein, a condenser in said vent line for condensing steam from the mixture of steam and non-condensable gases passing from said chamber to said tank through said line, means for circulating, as cooling fluid, water from said surge tank through said condenser in intimate contact with the vapor mixture flowing therethrough, a vent in said surge tank to permit the escape of said non-condensable gases to the atmosphere and means for conveying gas-free water from said deaerating chamber.

7. The apparatus of claim 1 wherein said deaerating chamber contains auxiliary heating means in the bottom thereof to maintain the gas-free water therein at its boiling point.

References Cited in the file of this patent

UNITED STATES PATENTS

| 1,401,101 | Ehrhart | Dec. 20, 1921 |
| 1,511,876 | Ehrhart | Oct. 14, 1924 |
| 1,596,423 | Gibson | Aug. 17, 1926 |
| 1,758,566 | Elliot | May 13, 1930 |
| 2,292,138 | Lockhart et al. | Aug. 4, 1942 |
| 2,515,647 | Hunt et al. | July 18, 1950 |
| 2,515,651 | Harrison et al. | July 18, 1950 |
| 2,626,005 | Sebald | Jan. 20, 1953 |